UNITED STATES PATENT OFFICE.

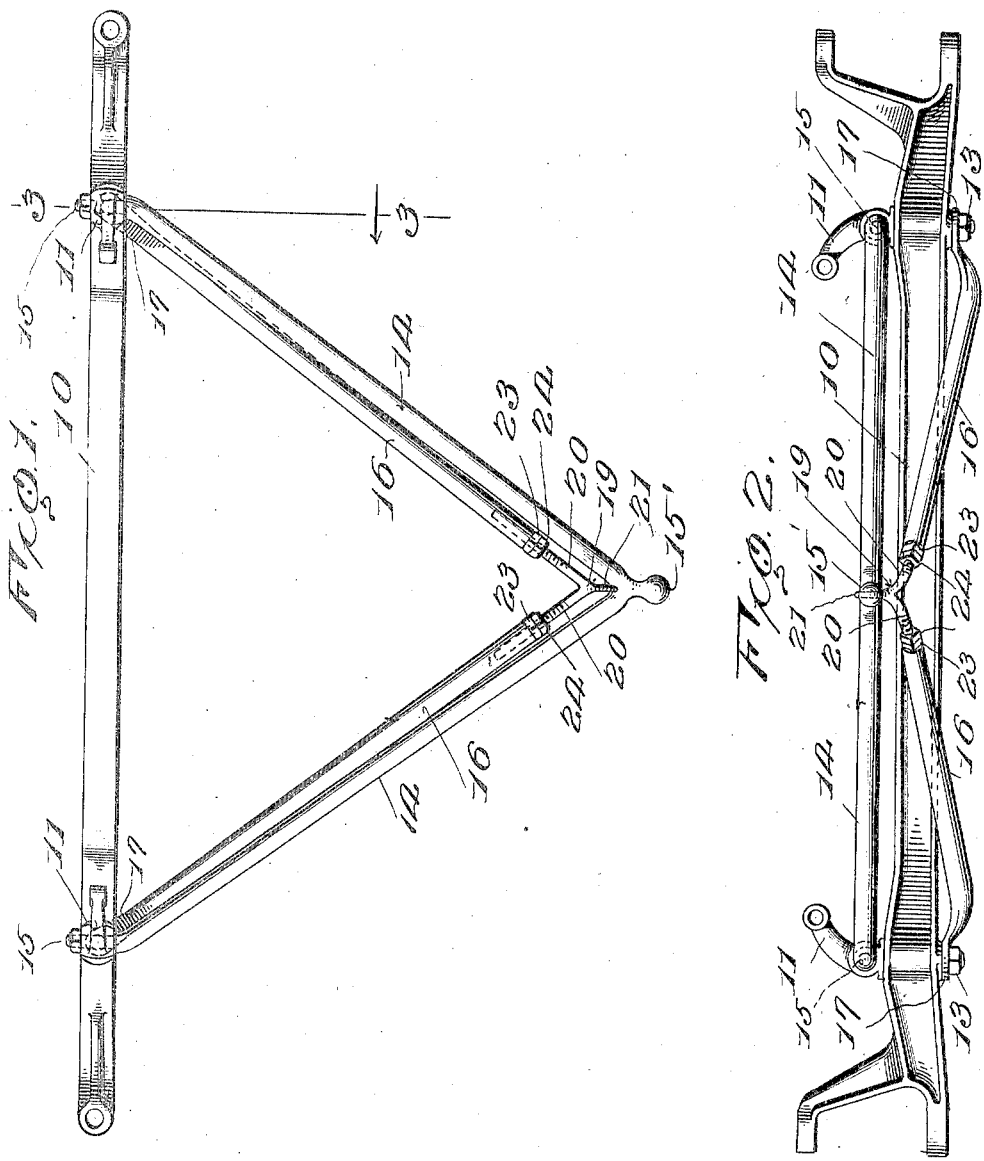

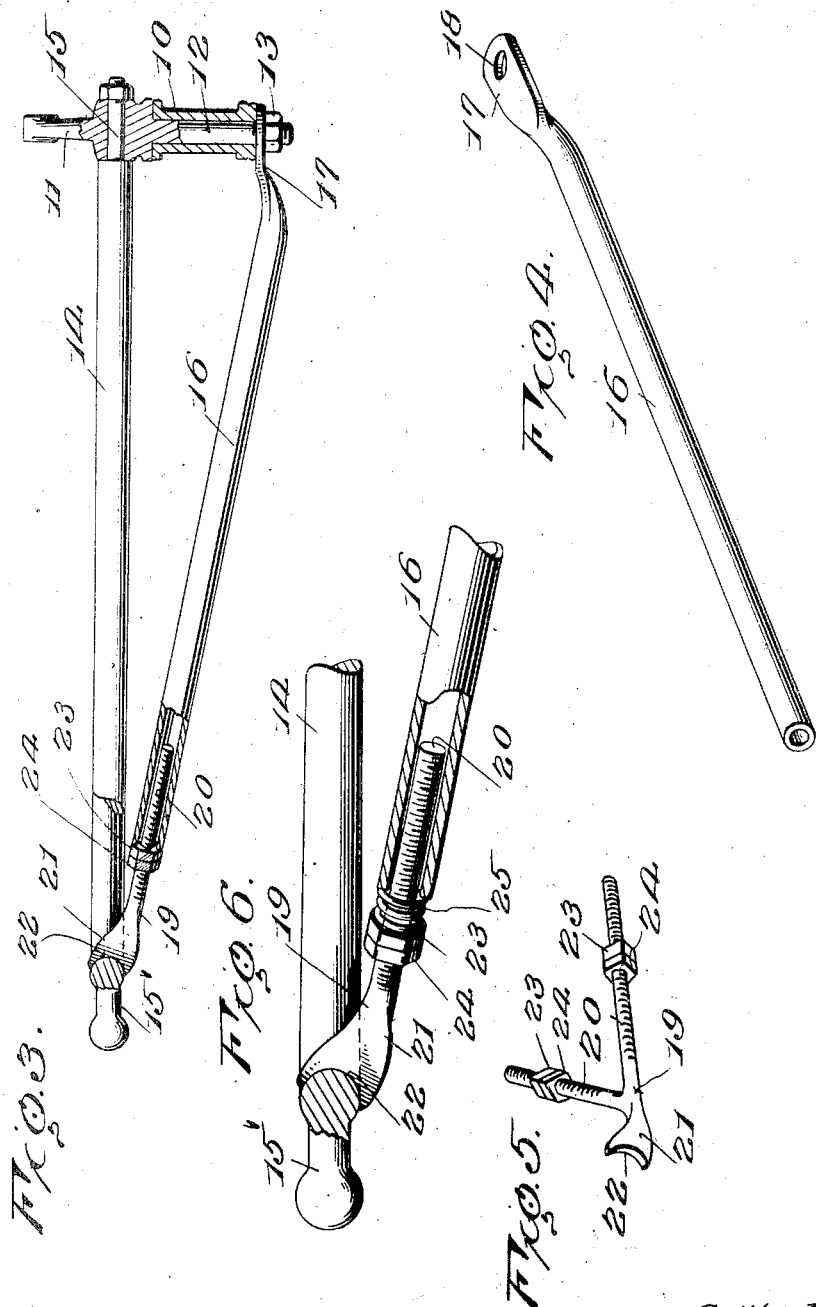

CHARLES W. MURPHY AND WILLIAM J. BRITTAIN, OF HOLDENVILLE, OKLAHOMA.

FRONT-RADIUS-ROD BRACE FOR MOTOR-VEHICLES.

1,302,698.  Specification of Letters Patent.  Patented May 6, 1919.

Application filed June 4, 1918. Serial No. 238,173.

*To all whom it may concern:*

Be it known that we, CHARLES W. MURPHY and WILLIAM J. BRITTAIN, citizens of the United States, residing at Holdenville, in the county of Hughes and State of Oklahoma, have invented certain new and useful Improvements in Front-Radius-Rod Braces for Motor-Vehicles, of which the following is a specification.

This invention relates to an improved front radius rod brace for motor vehicles, being particularly designed for attachment to vehicles of the Ford type, and has as its primary object to provide a device of this character adapted to rigidly brace the front radius rods of the vehicle with respect to the front axle.

The invention has as a further object to provide a brace adapted to extend between the crotch of the front radius rods and the lower side of the front axle of the vehicle so that the brace will thus not only rigidly support the radius rods with respect to the axle but will also brace the axle against any tendency toward tilting or axial movement.

And the invention has as a still further object to provide a brace which may be initially applied with ease and which may be readily adjusted to bind between the radius rods and front axle of the vehicle.

Other and incidental objects will appear as the description proceeds. In the drawings wherein I have illustrated the preferred embodiment of the invention, and wherein similar reference characters designate corresponding parts throughout the several views:

Figure 1 is a plan view showing our improved brace in connection with the front axle and front radius rods of a vehicle of the Ford type, Fig. 2 is a rear elevation more particularly illustrating the disposition of the brace beneath the radius rods, Fig. 3 is a transverse sectional view taken on the line 3—3 of Fig. 1 and looking in the direction of the arrows, this view showing the connection between the truss rods of the brace and the front axle of the vehicle and being partly broken away to illustrate the adjustable connection between the brace rods and the fork employed at the crotch of the radius rods, Fig. 4 is a perspective view showing one of the truss rods in detail, Fig. 5 is a perspective view showing the brace fork in detail, and Fig. 6 is a fragmentary sectional view showing a slight modification of the invention.

In order that the construction, mounting and operation of our brace may be accurately understood we have, in the drawings, shown the device in connection with the front radius rods, front axle and associated parts of a conventional motor vehicle of the Ford type. In the drawings, the front axle is indicated at 10. Connected to this axle adjacent opposite ends thereof are the brackets 11 for the front spring of the vehicle. These brackets are, as particularly shown in Fig. 3 of the drawings, formed with reduced shanks 12 which extend through the axle and are secured at their lower ends by nuts 13 threaded upon the said shanks. Connected with the brackets above the axle are the front radius rods 14 provided at their forward ends with reduced terminals 15 which extend through the said brackets and are secured by nuts threaded on the outer ends of said terminals. The rods 14 converge toward their rear ends and are united by a head 15 adapted for operative connection with the casing of the vehicle engine in the usual manner.

Coming now more particularly to the subject of the present invention, we employ coacting tubular truss rods 16. One of these rods is shown in detail in Fig. 4 of the drawings and, as there illustrated, said rods are deflected laterally adjacent the outer ends thereof and are formed with offset flattened terminals 17 which are provided with openings 18. In connection with the truss rods we further employ a connecting fork 19 between the inner ends of the said rods. This fork is shown in detail in Fig. 5 of the drawings. The fork 19 is formed with diverging threaded fork arms 20 united at their inner ends by a flattened head 21 extending laterally from the junction of the said arms and disposed in a plane at substantially right angles thereto. Furthermore, this head rises toward its outer end from the plane of the arms and is cut away upon its outer edge to provide a concave forked seat 22. The fork arms 20 each carry superposed nuts 23 and 24 respectively and are adapted to be slidably received within the inner ends of the truss rods 16.

In applying the device the arms 20 of the fork 19 are first inserted in the inner ends of the truss rods 16 when the nuts 13 upon the lower ends of the spring bracket shanks are removed and the flattened terminals 17 of the truss rods fitted over the said shanks which are received through the openings 18 in the said terminals. The nuts 13 are then again applied and adjusted to tightly clamp the flattened terminals of the truss rods against the lower edge of the front axle. The head 21 of the fork 19 is then engaged in the crotch of the front radius rods 14 by its forked seat 22 which, as shown in Fig. 3 of the drawings, is formed to fit around the said crotch. The brace is thus connected at its inner end with the truss rods. The nuts 23 upon the fork arms 20 are then adjusted outwardly upon the said arm for tightly binding the brace between the crotch of the truss rods and the lower edge of the front axle, when the nuts 24 are positioned for locking the nuts 23 at adjustment. Thus, it will be seen that the brace will, as a whole, act as a rigid strut between the front axle of the vehicle and the crotch of the radius rods and will rigidly support the said rods with respect to the axle. Furthermore, it will be seen that the brace will act to rigidly support the axle at its lower edge and will thus tend to prevent turning or axial movement of the axle with respect to the radius rods. We, therefore, provide a particularly simple and efficient construction for the purpose set forth and a device which may be readily applied without the necessity for any structural change in the motor vehicle. Furthermore, it will be noted that we also provide a device wherein any looseness developing in the brace or in the front radius rods may be readily taken up from time to time as occasion may demand.

In Fig. 6 of the drawings we have illustrated a slight modification of the invention which relates more particularly to the interposition of helical springs 25 between the nuts 23 upon the fork arms and the inner ends of the truss rods 16, these springs being arranged to surround the said fork arms. Otherwise, this modification is constructed in accordance with the preferred form of the invention and it will be seen that by employing the said springs, the brace will be permitted to yield under extreme stress so as to obviate the possibility of breaking of the truss rods.

Having thus described the invention, what is claimed as new is:

1. A device of the character described including independent truss rods, a connecting fork for the rods having fork arms, a crotch engaging head rigid with the arms, the arms being loosely engaged with said rods, and means for adjusting the fork longitudinally with respect to the rods.

2. A device of the character described including independent truss rods, a connecting fork for the rods having fork arms, a crotch engaging head integral with and extending from the juncture of the arms, the arms being loosely engaged with said rods, and means for adjusting the fork longitudinally with respect to the rods.

3. A device of the character described including independent truss rods, a connecting fork for the rods having fork arms, a head carried by the fork and adapted to engage in the crotch of the front radius rods of a vehicle for holding the fork against rotation about the longitudinal axis of the head, the arms being loosely engaged with said rods, and means for adjusting the fork longitudinally with respect to the rod.

4. In a front radius rod brace for motor vehicles, the combination of independent truss rods connected at their outer ends with the front axle of the vehicle, a connecting fork for the rods having fork arms loosely engaged with the inner ends of said rods, means carried by the fork and engaging in the crotch of the front radius rods of the vehicle for holding the fork against turning movement, and means for adjusting the fork longitudinally with respect to the rods.

In testimony whereof we affix our signatures.

CHARLES J. MURPHY. [L. S.]
WILLIAM J. BRITTAIN. [L. S.]